US006718643B2

(12) United States Patent
Tamamura

(10) Patent No.: US 6,718,643 B2
(45) Date of Patent: Apr. 13, 2004

(54) LASER LINE BEAM EMITTING APPARATUS HAVING FUNCTIONS OF EMISSION OF A STRAIGHT LASER LINE BEAM THEREFROM INTO THE AREA AT THE WIDE-ANGLE, AND A METHOD THEREOF

(75) Inventor: Akihito Tamamura, Sabae (JP)

(73) Assignee: Kabushiki Kaisha Audio-Technica, Tokyo (JP)

( * ) Notice: Subject to any disclaimer, the term of this patent is extended or adjusted under 35 U.S.C. 154(b) by 4 days.

(21) Appl. No.: 10/173,724

(22) Filed: Jun. 18, 2002

(65) Prior Publication Data

US 2003/0000094 A1 Jan. 2, 2003

(30) Foreign Application Priority Data

Jul. 2, 2001 (JP) ......................................... 2001-200856

(51) Int. Cl.[7] ............................................... G01C 15/00
(52) U.S. Cl. ................... 33/286; 33/281; 33/DIG. 21; 366/138
(58) Field of Search ................... 33/286, 290, DIG. 21, 33/227, 281, 283, 285, 291

(56) References Cited

U.S. PATENT DOCUMENTS

| 3,117,480 | A | * | 1/1964 | Peddinghaus | 33/286 |
|---|---|---|---|---|---|
| 3,590,704 | A | * | 7/1971 | Endo | 33/285 |
| 5,539,990 | A | * | 7/1996 | Le | 33/283 |
| 5,621,203 | A | * | 4/1997 | Swartz et al. | 235/462.11 |
| 5,761,570 | A | * | 6/1998 | Sawayama et al. | 399/49 |
| 6,009,630 | A | | 1/2000 | Rando | |
| 6,163,969 | A | * | 12/2000 | Jan et al. | 33/286 |
| 6,187,018 | B1 | * | 2/2001 | Sanjay-Gopal et al. | 606/130 |
| 6,195,902 | B1 | * | 3/2001 | Jan et al. | 33/286 |
| 6,256,895 | B1 | | 7/2001 | Akers | |
| 6,473,980 | B2 | * | 11/2002 | Ripingill et al. | 33/506 |
| 6,536,122 | B2 | * | 3/2003 | Tamamura | 33/283 |
| 6,598,304 | B2 | * | 7/2003 | Akers | 33/286 |

* cited by examiner

Primary Examiner—Christopher W. Fulton
Assistant Examiner—Amanda J Hoolahan
(74) Attorney, Agent, or Firm—Welsh & Katz, Ltd.

(57) ABSTRACT

For purpose of both of reduction in the number of parts that contributes to lower cost, and facilitated adjustment of location of a pair of laser beams for formation of a precise straight line beam drawn on objects in the wide-angle area, there are provided an apparatus and method having an improvement in emission of a laser line beam. The improvement comprises at least two pointer units each having a laser beam source for emission of a laser beam and a collimator lens for collimating the emitted beam, and a cylindrical lens arranged ahead of the units. With an arranged relationship between the pointer units and cylindrical lens, two beam fluxes from respective units cross each other at a point where the cylindrical lens is arranged, wherein the beam fluxes are at right angles to the central axis of the cylindrical lens. The diffused beams form the straight line beam.

11 Claims, 3 Drawing Sheets

LASER LINE BEAM EMITTING APPARATUS HAVING FUNCTIONS OF EMISSION OF A STRAIGHT LASER LINE BEAM THEREFROM INTO THE AREA AT THE WIDE-ANGLE, AND A METHOD THEREOF

FIELD OF THE INVENTION

The present invention relates to a laser line beam emitting apparatus, which is utilized for production of a vertical reference line drawn on a floor, a ceiling, and wall(s), and/or a horizontal reference line drawn on wall(s), for, e.g., provision of a partition to divide a room, in employment of the construction industry. Particularly, the present invention relates to a laser line beam emitting apparatus which allows for production of a laser line beam drawn in the range of wider angle.

BACKGROUND OF THE INVENTION

Nowadays, the construction industry uses the laser line beam emitting apparatus in place of the marking (or ink pad) technique, which carpenters or construction workers measure the objectives by drawing a vertical or horizontal line on respective surfaces with a Chinese ink or a chalk.

The laser line beam emitting apparatus is provided with a laser beam source unit for production of the drawn vertical or horizontal line. It is also provided with a gimbals mechanism having a pendulum hang threrefrom with maintenance in the location at the right angle with respect to the earth. The light source unit is mounted to the pendulum so that it is allowed to produce a vertical, or horizontal reference line passing walls, a ceiling and a floor, or front, back, right and left walls in a room. It is desired that the drawn, emitted vertical or horizontal reference line would be in the range of wider angle in the room, as shown in FIGS. 3, 2.

FIG. 3 shows that the emitted laser beam flux from a laser line beam emitting apparatus 1 positioned on a floor 2 forms a vertical reference line drawn on a ceiling 5, walls 3 and 4 on the right and left sides as well as the floor 2 without the discontinuity. Such the emission of the vertical reference line beam is desired to cover the area which is at wider angle θ with respect to the apparatus. It is also desired that the emission of the horizontal reference line beam drawn on walls 3 around the laser line beam emitting apparatus 1 allows for covering the area in the range of wider angle θ as shown in FIG. 2.

FIG. 4 is, as an example, a schematic view of a conventional laser line beam emitting apparatus having two laser beam source units which respectively comprise laser beam sources; collimator lenses through which the laser beams from respective laser beam sources are collimated; and cylindrical lenses through which respective collimated laser beams are diffused or widened, wherein the diffused or widened laser beams go rightward and leftward or in the opposite directions from each other as shown in the figure, respectively, and thus the foregoing laser line beam emitted therefrom and drawn on the objects without the discontinuity appears.

In FIG. 4, a laser line beam emitting apparatus on a floor has a base board 11 having three legs 12 mounted on and extending from the underside surface thereof to the floor. The base board 11 also has some columns or bars 13 mounted on and extending from the topside surface thereof. The upper columns or bars 13 are provided with respective gimbals mechanisms 14 from which a pendulum 15 is hung. The gimbals mechanisms 14 are, according to the figure, briefly shown. In detail, it has horizontal shafts orthogonal to each other, and is hanging the pendulum 15 from some swinging elements which are swingy held through the horizontal shafts combined such that the pendulum can move to all directions and can be, irrespective of the base board 11 being tilted, always at the position where it is plumb with respect to the horizontal.

The pendulum 15 has a pair of laser beam source units 21, 22 mounted at the top end thereof on respective left and right sides. The pair of laser beam source units 21 and 22, which are mounted on the pendulum 15, are arranged such that the left unit 21 faces to the left outward and tilts the head up, while the right unit 22 faces to the right outward and tilts the head up, with respect to the earth. The left and right units 21, 22 comprise elements such as laser diodes 23, 26, collimator lenses 24 and 27 through which the emitted laser beams from the laser diodes 23, 26 are collimated, and cylindrical lenses 25 and 28 through which the collimated, emitted laser beams are widened in only the vertical direction with respect to the horizontal, respectively. The laser beams from the laser beam source units 21 and 22 widen to the areas in the range of angles θ1 and θ2 with respect to the centers of the cylindrical lenses 25 and 28, respectively.

The widened laser beams from respective laser beam source units 21 and 22 overlap in part with formation of a laser line beam on the objective surfaces, wherein the laser line beam widens to the area in the range of the angle θ as shown in FIG. 3, that is at the angle wider than the forgoing angles θ1 and θ2.

For performance of the production of widened laser line beam(s) that form the reference line drawn on the objects at the wide area in the range of the angle θ as shown in FIG. 3, the foregoing conventional laser line beam emitting apparatus requires two or a pair of laser beam source units each having a laser beam source, and collimator and cylindrical lenses. This raises cost of the sales. Such the emitting apparatus also requires that the pair of laser beam source units are angularly adjusted into a position such that emission of laser line beams therefrom can produce a straight line drawn on the objects without the discontinuity. This is very hard works.

SUMMARY OF THE INVENTION

In view of the subject matters as stated above, it is the first object of the present invention to provide a laser line beam emitting apparatus having functions of emission of at least one laser line beam into the area at the wide-angle as well as reduction in cost of the sales. In addition, it is the second object of the present invention to provide a laser line beam emitting apparatus, which allows for facilitation of the angular adjustment of laser beams going toward the objects.

The laser line beam emitting apparatus according to the present invention performs production of a vertical or horizontal straight laser line beam by use of only a single cylindrical lens. The cylindrical lens is positioned ahead of at least two pointer units, in place of the foregoing laser beam source units. Each of the pointer units points their own outlet at the cylindrical lens.

The pointer units are arranged such that the emitted laser beams from respective outlets cross each other. The single cylindrical lens is positioned at the intersection point of the laser beams, wherein the central axis of the cylindrical lens lies at right angles to the vertical or is parallel to the vertical. The laser beams go toward the cylindrical lens after being collimated through respective collimator lenses provided in respective pointer units. Passing through the cylindrical lens, the collimated laser beams are vertically or horizontally diffused in the opposite directions from each other so that a straight laser line beam without the discontinuity appears.

The intersection point of the laser beams is at the center axis of the cylindrical lens, and both the optical axes of the laser beams from respective pointer units are at right angles to the central axis of the cylindrical lens. Such the crossing laser beams provides a precise straight line plumb or parallel to the horizontal.

The cylindrical lens and pointer units are mounted to a pendulum which is pendant through gimbals mechanism(s). The combination of the pendulum and gimbals mechanism (s) prevents the tilted laser line beam emitting apparatus affecting production of precisely drawn reference vertical or horizontal line beam from the combination of the pointer units and cylindrical lens. This can accommodate the cylindrical lenses and pointer units to the marking technique in the construction industry.

The foregoing construction of the laser line beam emitting apparatus enables precise drawing of a vertical or horizontal straight laser line beam formed in the area at the wide-angle, in following fashions.

In the laser line beam emitting apparatus according to the present invention, at least two pointer units each having a laser beam source and a collimator lens are provided. Each of the laser beam sources emits a laser beam toward the collimator lens. The collimator lenses collimate the emitted laser beams, respectively. The pointer units are arranged to cross the collimated, emitted laser beams at a position. At the intersection point of the collimated laser beams, a cylindrical lens is disposed. From the intersection point, the crossed laser beams each are vertically or horizontally diffused from the cylindrical lens for formation of a straight laser line beam at the wide-angle area around the cylindrical lens.

Mounting of the cylindrical lens and pointer units to a pendulum which is pendant through gimbals mechanisms provides a marking technique in the construction industry.

PREFERRED EMBODIMENTS OF THE INVENTION

Figure 3:
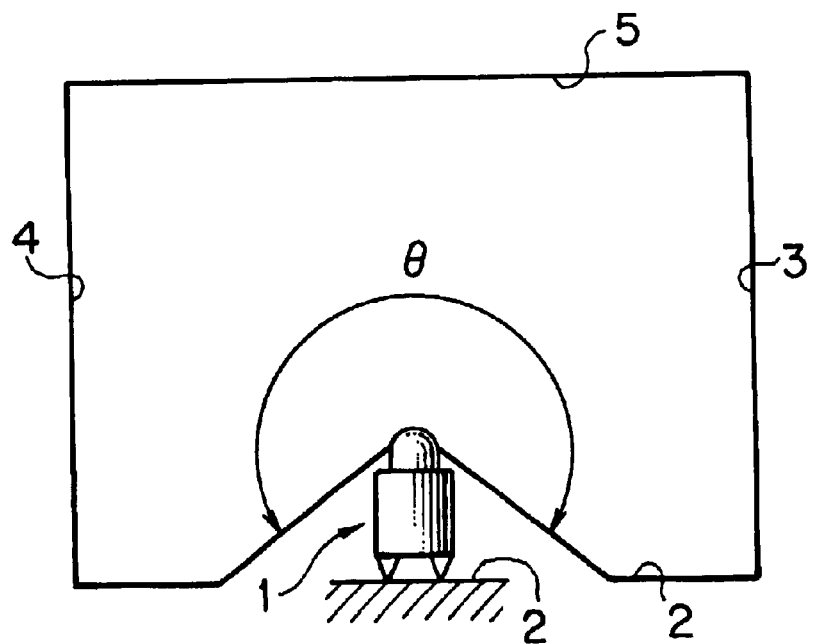
FIG. 3 is a schematic front view of a laser line beam emitting apparatus, as an example of conventional.
Figure 4:
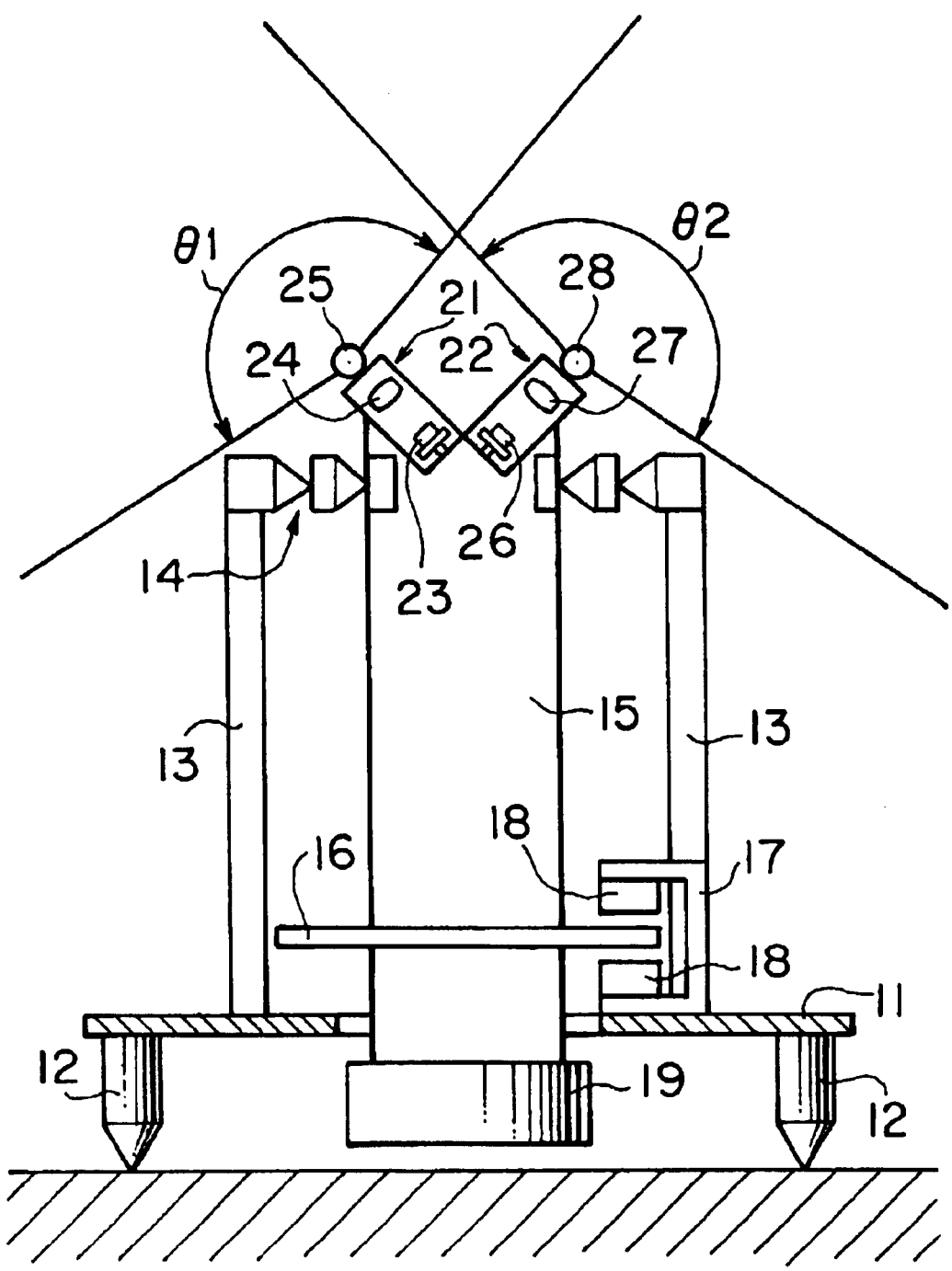
FIG. 4 is a schematic front view of parts of the conventional laser line beam emitting apparatus having a function of emission of a laser line beam in the area at the wide-angle, as an example.

The following are embodiments of the present invention which is directed to an apparatus for producing a straight laser line beam emitted therefrom into the area at the wide-angle and a method of producing the same, with reference to the figures. Both of the apparatus and method according to the present invention are shown in FIG. 1, and the figure includes representation of numeral references same as ones of FIG. 3, in which same components of the conventional apparatus are depicted.

Figure 1:
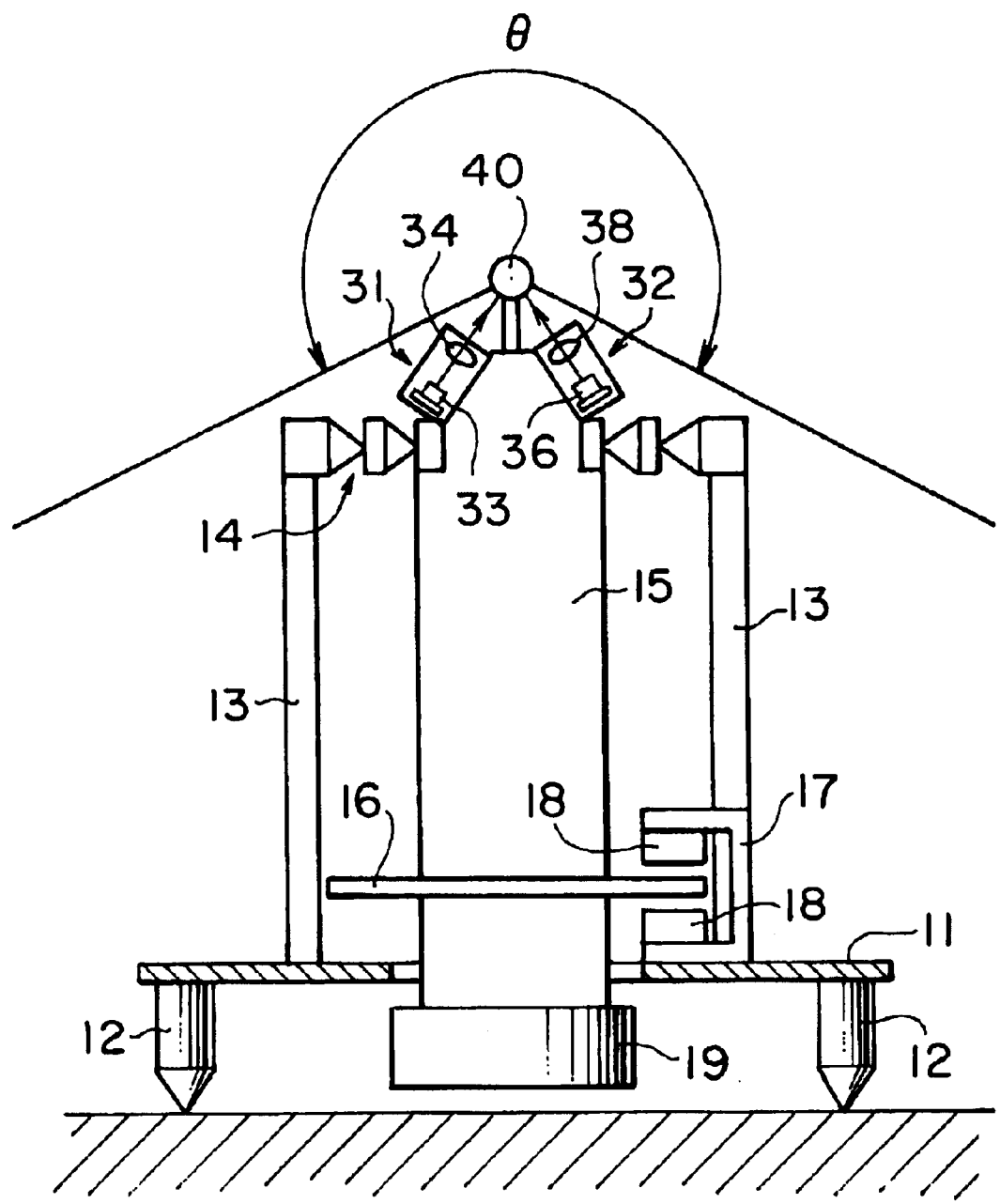
FIG. 1 is a schematic sectional view of parts of an apparatus for and method of emitting a laser line beam in the area at the wide-angle, according to the present invention.

Referring to FIG. 1, the laser line beam emitting apparatus has a base board 11. It is supported against a support such as floor by three legs 12 mounted on the surface of the base board 11 on the downside thereof with the downward extension therefrom. Whereas, on the surface of the base board 11 on the topside thereof, there are some columns or poles 13 mounted thereon with the upward extension therefrom. The columns 13 have gimbals mechanisms 14, respectively, wherein a pendulum 15 is pendant through the gimbals mechanisms 14. Each of the gimbals mechanisms 14 has a pair of horizontal shafts orthogonal to each other, in which one of the horizontal shafts has a swinging elongate link linked thereto for the swing, and the swinging elongate link holds the other shaft from which the pendulum 15 is pendant. This permits swing of the pendulum 15 in any directions. Such the pendulum 15 always has its plumb position, even though the base board 11 is tilted. In the present invention, the plumb position of the pendulum may be of other constructions. For the reason, FIG. 1 is of a brief depiction of the gimbals mechanism 15.

In addition, FIG. 1 shows that the pendulum of the laser line beam emitting apparatus according to the present invention is provided with a pair of pointer units 31, 32 instead of the foregoing two laser source units that are generally employed. The pointer units 31, 32 comprise devices such as laser diodes 33, 36 as laser beam sources, and collimator lenses 34, 38 through which the emitted laser beams from the laser diodes 33, 36 are collimated, respectively.

The combined pointer units 31, 32 as shown in FIG. 1 are employed for the emitted vertical reference laser line beam. On the top pendulum at right and left sides, the pair of pointer units 31, 32, respectively, take up positions where the emitted laser beams therefrom are directed to any objects above the laser line beam emitting apparatus. The left pointer unit 31 is leaned downward from the vertical such that the emitted laser beam therefrom goes to the upper right oblique direction, while the right pointer unit 32 is leaned from the vertical such that the emitted laser beam therefrom goes to the upper left oblique direction. Thus, the pair of pointer units 31, 32 has a form like that they face and bow to each other.

The pair of pointer units 31, 32 according to the present invention are positioned such that both of the collimated, emitted laser beams in respective upper right and left oblique directions cross each other at the position spaced above the pendulum 15 at the intermediate point of the diameter thereof. In addition, a cylindrical lens 40 is provided at the positions where the collimated, emitted laser beams from respective pointer units 31, 32 pass or cross each other.

The cylindrical lens 40 takes up a position where the laser beams pass the central axis, and the passage paths of respective laser beams are at the right angles to the central axis. With such the relationship of the central axis and laser beams, the cylindrical lens 40 is longitudinally parallel to the horizontal. Thus, the cylindrical lens 40 provides the crossing of two laser beam flux from respective right and left sides on the central axis. For locating the cylindrilcal lens 40 above the pendulum 15, projection(s) extending from the pendulum 15, the other holder device(s), and so on allow for hold of the cylindrical lens 40.

Both of the collimated laser beams from respective pointer units 31, 32 have, after the passage of the cylindrical lens 40, diffusion only in the vertical direction from the central axis of the lens 40. As stated above, control of the pair of collimated laser beams as to the crossing at a portion in combination with the position of the cylindrical lens 40 on the crossing point of the laser beams as well as the incidence of the beams from a direction orthogonal with respect to the central axis (in other words, provision of the optical axes having respective sections at right angles to each other, coming from respective pointer units 31, 32) are given according to the invention. Hence, both of the collimated laser beams are diffused with reference to the central axis of the cylindrical lens 40. Thus, the diffused, collimated laser beams are connected to each other with reference to the central axis of the cylindrical lens so that a laser line beam without discontinuity appears on the objectives. In addition, since the two laser beams are emitted from the foregoing pointer units 31, 32 which are previously leaned from the vertical in the opposed directions or at different angles relative to each other, the laser line beam formed without discontinuity is drawn on a ceiling to walls and the walls to a floor, in the wide area around an angle θ from the horizontal or the central axes of the cylindrical lens 40, as shown in FIG. 1.

As stated above, when the laser line beam emitting apparatus provides function of emission of the reference vertical line, the foregoing pointer units 21, 22 with respective collimator lenses 24, 27 are leaned downward from the vertical such that the collimated, emitted laser beams from respective pointer units cross each other. The cylindrical lens is at the point of intersection of two collimated laser beams. Passing through the cylindrical lens, each of the collimated laser beams is diffused in the vertical direction such that a straight laser line beam without the discontinuity is vertically formed in the wide area around the apparatus.

Description now will be made of employment of the combined pointer units 31, 32 for the emitted reference horizontal laser line beam, with reference to FIG. 2. For production of the reference horizontal laser line beam, the laser line beam emitting apparatus also may have a following construction.

For production of the horizontal line, the pair of the pointer units 31, 32 are mounted to the pendulum 15 such that the collimated laser beams go forward, backward, or sideward. Such the pair of the pointer units 31, 32 are also arranged behind the cylindrical lens 40, wherein the collimated laser beams cross each other at a position (of the cylindrical lens 40), in the same fashion with the construction of FIG. 1. The pendulum 15 with the pointer units 31, 32 and cylindrical lens 40 is pendant through the forgoing gimbals mechanism.

With regard to production of the emitted reference horizontal laser line beam, the cylindrical lens 40 is positioned such that its central axis lies at right angles to the horizontal. With such the construction, passing through the cylindrical lens 40, each of the collimated laser beams is diffused in the horizontal direction such that a straight laser line beam without the discontinuity is horizontally formed in the wide area (e.g., four or three walls 3) around the angle θ from the central axis of the cylindrical lens 40. Thus, the produced laser line beam is a horizontal straight line without the discontinuity, as shown in FIG. 2.

As stated above, according to the present invention, a single cylindrical lens diffuses the collimated laser beams from respective pointer units in the vertical or horizontal direction. The diffused laser beams from the cylindrical lens can form a vertical or horizontal straight line without the discontinuity, which is drawn on the objects. This contributes to reduction in the number of components of the laser line beam emitting apparatus. Because of that passing the collimated laser beams through the central axis of the single cylindrical lens allows for production of a vertical or horizontal line without the discontinuity, the adjustment of orientation of the pointer units is only a determination of locating relationship between the collimated optical axes and the central axis of the cylindrical lens. This adjustment is very easy.

Figure 2:
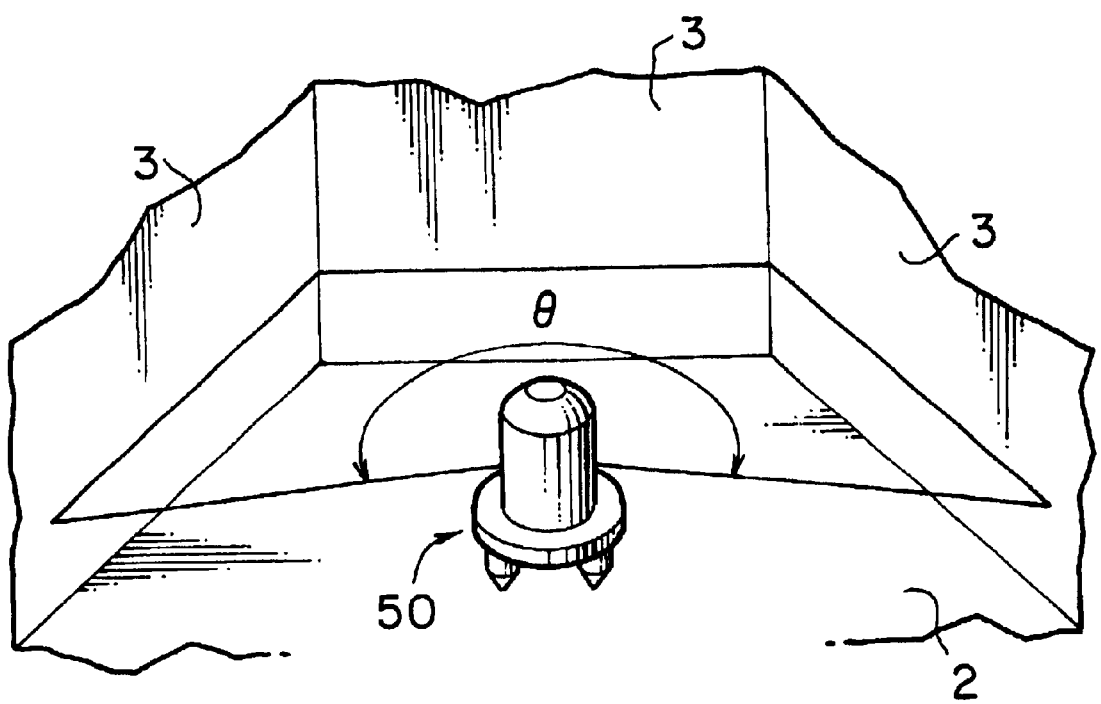
FIG. 2 is a schematic oblique view of the other example in employment of the construction according to the present invention.

In the embodiment illustrated in FIGS. 1, 2, the laser line beam emitting apparatus may be provided with a brake device which is of an electromagnetic induction type. Turning to FIG. 1, the brake device comprises a braking plate 16 disposed on the outer surface of the pendulum 15 so as to form a flange above the base plate 11; a yoke 17 fixedly mounted on the base board 11, the yoke being of U-shape which is turned to about 90 degree angle from the vertical; and a pair of magnets 18 fixedly mounted to the leaned U-shape yoke on the inner surfaces at respective upper and lower portions. The braking plate 16 is made of e.g. copper material. The braking plate 16 is interposed between opposed surfaces of respective magnets 18 spaced to each other.

The base board 11 is formed with an opening at a position thereof such that the pendulum 15 extends through the opening down, wherein the pendulum 15 is mounted with a main weight 19 at the lower end thereof. The main weight 19 permits the pendulum 15 to have its center of gravity at the position as low as possible. This enables higher precise plumb maintenance of the pendulum 15.

According to the embodiment, when the pendulum 15 is subject to plumb failure, the foregoing brake device corrects the failure to allow the pendulum to return to the plumb maintenance. The plumb failure of the pendulum 15 causes any movements of the braking plate 16 from the formed magnetic field between the magnets 18, whereby eddy current is passed on the brake plate 16. The resultant eddy current loss through Jule heat can electromagnetically brake the braking plate 16. This returns the pendulum 15 to the plumb maintenance for a short period of time. It also provides increased stability of the plumb maintenance of and elimination of unbalance of the pendulum 15.

What is claimed is:

1. An apparatus for emitting a laser line beam onto objectives therearound comprising:

at least two pointer units which comprise first and second pointer units, the first and second pointer units, the first and second pointer units for emission of respective first and second laser beams each having a laser beam source from which a laser beam is emitted, and a collimator lens through which the emitted laser beam from the laser beam source is collimated, said first and second pointer units arranged such that said first and second collimated, emitted laser beams cross each other at a predetermined point; and a cylindrical lens through which said first and second collimated laser beams are diffused, the cylindrical lens being arranged in said predetermined point such that said first and second collimated, emitted laser beams lie at least at a right angle to a longitudinal axis of the cylindrical lens, the first and second laser beams being diffused from said predetermined point in the opposite directions from each other, the diffused first laser beam in combination with the second laser beam providing formation of a straight laser line beam emitted and drawn onto said objectives without a discontinuity, in an area around a predetermined angle from the horizontal or the central axes thereof.

2. The apparatus of claim 1, further comprising:

at least one gimbals mechanism; and a pendulum being pendant in said apparatus through at least one said gimbals mechanism, said first and second pointer units and said cylindrical lens being mounted to said pendulum.

3. The apparatus of claim 1, further comprising at least one gimbals mechanism;

a pendulum being pendant in said apparatus through at least 10 one said gimbals mechanism, said first and second pointer units and said cylindrical lens being mounted to said pendulum; and a brake device for electromagnetically braking swing of said pendulum for prevention of tilting of said first and second pointer units and said cylindrical lens.

4. An apparatus for emitting a laser line beam onto objectives therearound comprising:

at least two pointer units which comprise first and second pointer units, the first and second pointer units for emission of respective first and second laser beams each having a laser beam source from which laser beam is emitted, a collimator lens through which the emitted laser beam from the laser beam source is collimated, and an outlet from which the collimated laser beam is emitted, the first and second pointer units being arranged at spaced intervals; and a cylindrical lens having a central axis, the cylindrical lens being positioned ahead of said first and second pointer units at a point intermediate therebetween, the first and second pointer units, respectively, being tilted from different vertical directions such that said outlets are oriented to the cylindrical lens at at least a right angle to a longitudinal axis of the cylindrical lens, and that the collimated laser beams from respective outlets pass the central axis of the cylindrical lens, whereby a vertical or horizontal straight line beam without a discontinuity is formed on said objects.

5. The apparatus of claim 4, wherein said first and second collimated, emitted laser beams from respective first and second pointer units each have an optical axis, and wherein said central axis of the cylindrical lens lies at right angles to said optical axes of the first and second collimated, emitted laser beams.

6. The apparatus of claim 4, wherein said first and second collimated, emitted laser beams from respective first and second pointer units each have an optical axis, wherein said optical axes each have a section, and wherein the sections of optical axes of respective first and second laser beams are at right angles to each other at the passage of the central axis of said cylindrical lens.

7. The apparatus of claim 4, further comprising at least one gimbals mechanism; and a pendulum being pendant in said apparatus through at least one said gimbals mechanism, said first and second pointer units and said cylindrical lens being mounted to said pendulum.

8. The apparatus of claim 4, further comprising at least one gimbals mechanism;

a pendulum being pendant in said apparatus through at least one said gimbals mechanism, said first and second pointer units and said cylindrical lens being mounted to said pendulum; and a brake device for electromagnetically braking swing of said pendulum for prevention of tilting of said first and second pointer units and said cylindrical lens.

9. A method of emitting a laser line beam onto objectives therearound comprising steps of providing at least two pointer units which include first and second pointer units, the first and second pointer units for emission of respective first and second laser beams each having a laser beam source from which a laser beam is emitted, and a collimator lens through which the emitted laser beam from the laser beam source is collimated;

making an arrangement of said first and second pointer 15 units such that said first and second collimated, emitted laser beams cross each other at a predetermined point; and making an arrangement of a cylindrical lens in said predetermined point, the first and second laser beams being diffused from said predetermined point in the opposite directions from each other, the diffused first laser beam in combination with the second laser beam providing formation of a straight laser line beam emitted and drawn onto said objectives in the wide-angle without a discontinuity.

10. The method of claim 9, wherein said cylindrical lens has a central axis, wherein said first and second collimated, emitted laser beams from respective first and second pointer units each have an optical axis, and wherein the arrangement of the cylindrical lens in said predetermined point is made such that said central axis of the cylindrical lens lies at right angles to said optical axes of the first and second collimated, emitted laser beams.

11. The method of claim 9, further providing at least one gimbals mechanism, and a pendulum being pendant in said apparatus through at least one said gimbals mechanism; and mounting said first and second pointer units and said cylindrical lens to said pendulum.

* * * * *